United States Patent
Furuichi et al.

(10) Patent No.: US 10,735,434 B2
(45) Date of Patent: *Aug. 4, 2020

(54) CONFIGURATION MANAGEMENT FOR VIRTUAL MACHINE ENVIRONMENT

(71) Applicant: International Business Machines Corporation, Armonk, NY (US)

(72) Inventors: Sanehiro Furuichi, Tokyo (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,847

(22) Filed: Nov. 16, 2018

(65) Prior Publication Data

US 2019/0089715 A1  Mar. 21, 2019

Related U.S. Application Data

(63) Continuation of application No. 16/038,679, filed on Jul. 18, 2018, now Pat. No. 10,243,966, which is a (Continued)

(51) Int. Cl.
*H04L 29/06* (2006.01)
*H04L 12/24* (2006.01)

(52) U.S. Cl.
CPC .......... *H04L 63/107* (2013.01); *H04L 41/085* (2013.01); *H04L 41/0816* (2013.01); (Continued)

(58) Field of Classification Search
CPC ..... H04L 63/107; H04L 63/08; H04L 63/105; H04L 63/10; H04L 63/0876; H04L 41/085; H04L 41/0816; H04L 41/0866
See application file for complete search history.

(56) References Cited

U.S. PATENT DOCUMENTS 8,544,003 B1  9/2013 Sawhney et al.
9,203,862 B1 * 12/2015 Kashyap ............... H04L 63/145
(Continued)

FOREIGN PATENT DOCUMENTS

JP   2010097510       4/2010
JP   2013174944       5/2013
WO   WO-2007087558 A2 *  8/2007  ........... G06F 9/5005

OTHER PUBLICATIONS

IBM, List of IBM Patents or Patent Applications Treated as Related, Nov. 15, 2018, 2 pages.

*Primary Examiner* — Ayoub Alata
(74) *Attorney, Agent, or Firm* — Stosch Sabo

(57) ABSTRACT

A computer-implemented method for controlling a connection between a virtual machine and a physical device comprises receiving a connection request for connecting the physical device to the virtual machine and determining whether the virtual machine satisfies a first connection permission condition and whether the physical device satisfies a second connection permission condition. In response to a determination that the virtual machine does not satisfy the first connection permission condition, a configuration of the virtual machine is changed to satisfy the first connection permission condition. In response to a determination that the physical device does not satisfy the second connection permission condition, a configuration of the physical device is changed to satisfy the second connection permission condition. In response to a determination that the virtual machine satisfies the first connection permission condition and that the physical device satisfies the second connection permission condition, the received connection request is accepted.

17 Claims, 6 Drawing Sheets

Related U.S. Application Data continuation of application No. 15/653,831, filed on Jul. 19, 2017, now Pat. No. 10,142,352, which is a continuation of application No. 14/736,422, filed on Jun. 11, 2015, now Pat. No. 9,742,782.

(52) U.S. Cl.
CPC ...... *H04L 41/0866* (2013.01); *H04L 63/0876* (2013.01); *H04L 63/08* (2013.01); *H04L 63/10* (2013.01); *H04L 63/105* (2013.01)

(56) References Cited

U.S. PATENT DOCUMENTS

| | | |
|---|---|---|
| 9,742,782 B2 | 8/2017 | Furuichi et al. |
| 2007/0244905 A1 | 10/2007 | Ito et al. |
| 2008/0320495 A1 | 12/2008 | Akiyama et al. |
| 2013/0007737 A1 | 1/2013 | Oh et al. |
| 2013/0086648 A1 | 4/2013 | Jaudon et al. |
| 2014/0006572 A1 | 1/2014 | Nerieri |
| 2014/0282518 A1 | 9/2014 | Banerjee |
| 2014/0344806 A1 | 11/2014 | Suresh et al. |
| 2015/0163236 A1 | 6/2015 | Niemela |
| 2016/0366135 A1 | 12/2016 | Furuichi et al. |
| 2017/0006451 A1 | 1/2017 | Mandanapu |
| 2017/0318029 A1 | 11/2017 | Furuichi et al. |
| 2018/0324191 A1 | 11/2018 | Furuichi et al. |

\* cited by examiner

CONFIGURATION MANAGEMENT FOR VIRTUAL MACHINE ENVIRONMENT

BACKGROUND

The present disclosure relates to a virtual machine infrastructure, and more specifically, to a configuration management for a virtual environment.

A virtual machine is an emulation of a particular computer system. With the development of virtual machine technology, a virtual desktop environment is spreading more and more. Since a lot of virtual machines can be centrally managed by a server, a total cost of ownership (TCO) reduction effect can be expected. Further, since data exists only on the server, information leakage risks may be considered to be low.

A virtual desktop infrastructure (hereinafter also referred to as "VDI") is realized by, for example, VMware® Horizon View, Citrix Xen® Desktop, and Windows® Server ("VMware" is a registered trademark of VMware Inc. in the United States, other countries, or both; "Xen" is a registered trademark of Citrix Systems, Inc. in the United States, other countries, or both; and "Windows" is a registered trademark of Microsoft Corporation in the United States, other countries, or both).

SUMMARY

In one embodiment, a computer-implemented method for controlling a connection between a virtual machine and a physical device is provided. The method comprises receiving a connection request for connecting the physical device to the virtual machine and determining whether the virtual machine satisfies a first connection permission condition and whether the physical device satisfies a second connection permission condition. In response to a determination that the virtual machine does not satisfy the first connection permission condition, a configuration of the virtual machine is changed to satisfy the first connection permission condition. In response to a determination that the physical device does not satisfy the second connection permission condition, a configuration of the physical device is changed to satisfy the second connection permission condition. In response to a determination that the virtual machine satisfies the first connection permission condition and that the physical device satisfies the second connection permission condition, the received connection request is accepted.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1A:
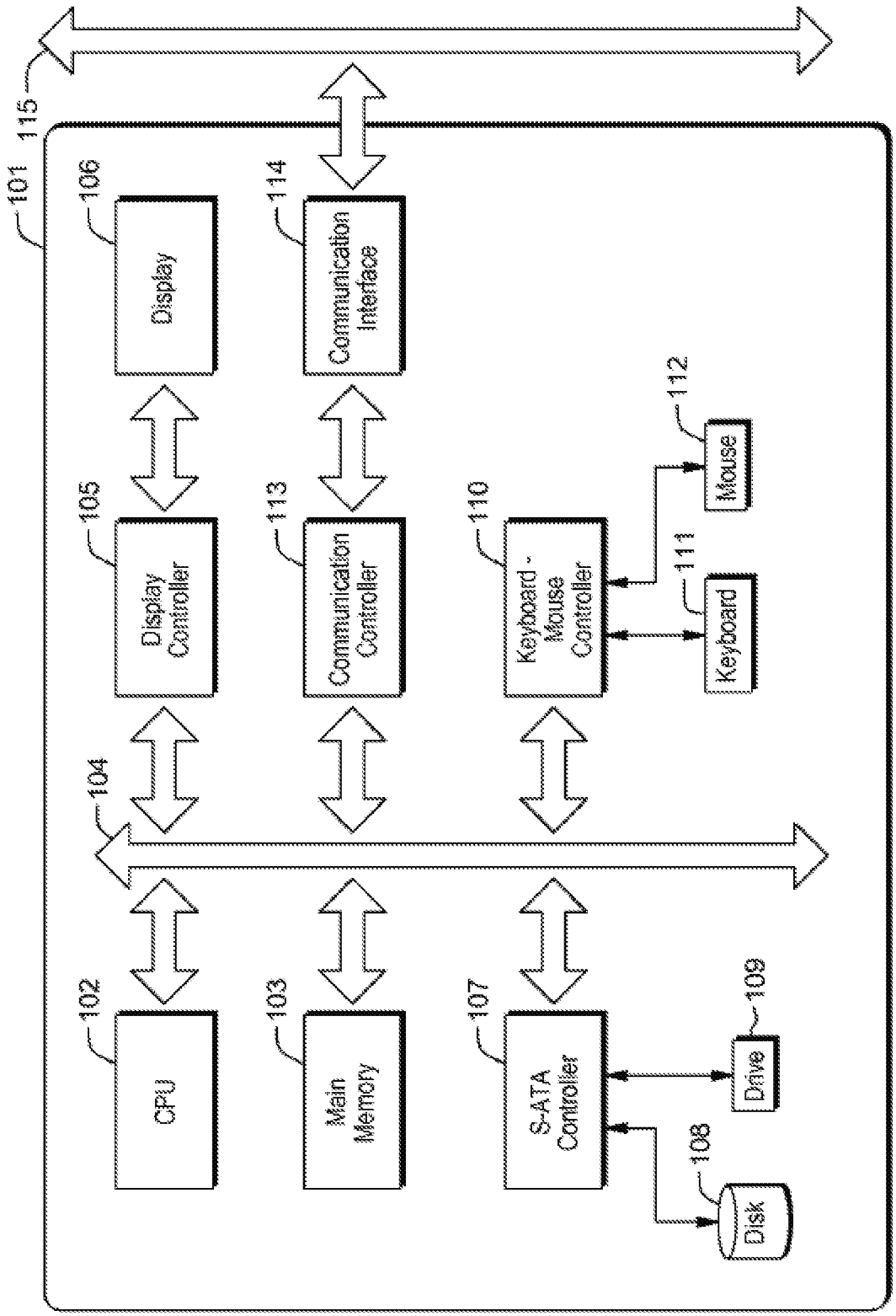
FIG. 1A illustrates an example basic block diagram of one embodiment of a physical device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to one of skill in the art.

The term, "virtual machine", refers to a system virtual machine or a process virtual machine. In an embodiment, the virtual machine is a device which may emulate a particular computer system. In another embodiment, the virtual machine may provide a virtual desktop. The virtual machine is used for a connection destination.

The term, "physical device" refers to a device which can be connected to a virtual machine via a communication network such as a wired or wireless channel. The physical device can display a virtual desktop by connecting to the virtual machine with, for example, a remote desktop connection over the communication network. The physical device is used for a connection request source.

The term, "configuration" refers to, for example, but is not limited to, a configuration relating to a virtual machine or a physical device; or a configuration associated with a virtual machine or a physical device. The configuration may comprise, for example, but is not limited to, a physical hardware configuration, such as a name or type of a hardware to be mounted in the physical device or to be connected to the physical device; a virtual hardware configuration, such as a name or type of a virtual hardware to be mounted in the virtual machine or to be connected to the virtual machine; a hardware setting parameter for the physical hardware configuration or the virtual hardware configuration; a software configuration, such as a name or type of a software to be installed on the physical device or the virtual machine; a software setting parameter for the software; a name or type of data accessible by a virtual machine or a physical device; a security setting or security policy of a virtual machine or a physical device; or an access control policy setting or access control policy of a virtual machine or a physical device. The access control policy or an access control policy is a rule set to decide whether a specific operation is allowed or prohibited to a specific resource. The software to be installed on the physical device or the virtual machine comprises an operating system, or a variety of software to be installed on the operating system.

The term, "a context", refers to, for example, but is not limited to, a parameter relating to a virtual machine or a physical device; or a parameter associated with a virtual machine or a physical device. The context may be variable according to, for example, a passage of time. The context may comprise, for example, but is not limited to, location of a physical device; model information on a virtual machine or a physical device; a current time; a predefined time, such as usage time or connection time of a virtual machine or a physical device; an application which is running on a virtual machine or a physical device; data which is being accessed by a virtual machine or a physical device; an IP address of a virtual machine or a physical device; an access point of a wireless or a wired LAN used by a physical device; an existence or nonexistence of a neighbor terminal; a progress of a process performed by a virtual machine or a physical device; user identification number, such as employee number, organization information, a managerial position, or an authority in an organization; or a user authority of a virtual machine or a physical device.

As used herein, the expression "a/one" should be understood as "at least one".

Figure 1B:
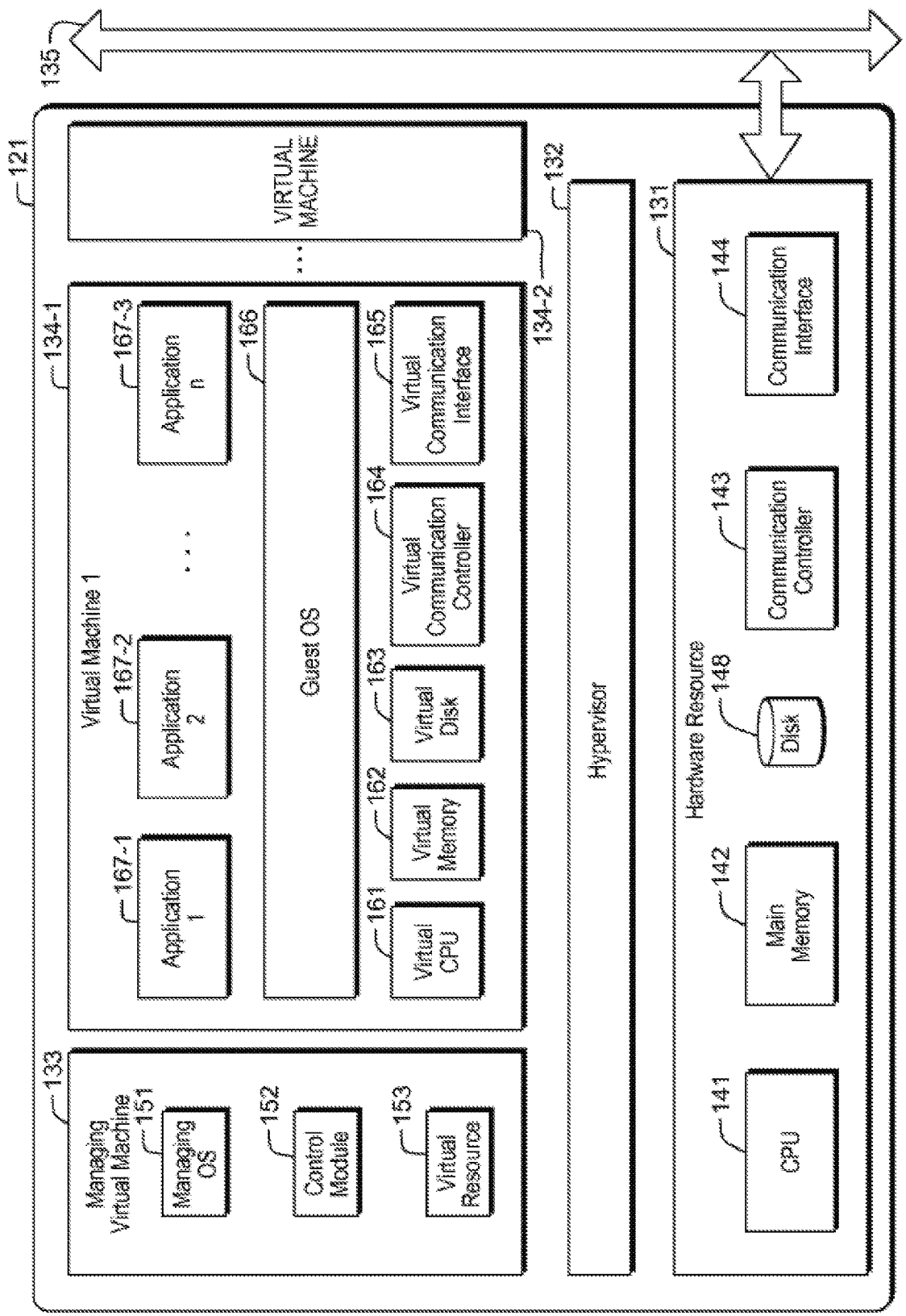
FIG. 1B illustrates an example basic block diagram of one embodiment of a computer on which at least one virtual machine can run.

FIGS. 1A and 1B illustrate example basic block diagrams of a computer hardware, especially a physical device or a computer, respectively, used in embodiments of the present disclosure.

FIG. 1A illustrates example basic block diagrams of one embodiment of a physical device (101). The physical device (101) may be, for example, but is not limited to, a computer, such as a desktop, a laptop, or a notebook computer; a thin client; a tablet; a smart phone; a mobile phone; a game terminal; or an internet television. The physical device (101) may comprise one or more CPUs (102) and a main memory (103) connected to a bus (104). The CPU (102) may be preferably based on a 32-bit or a 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; the Phenom™ series, the Athlon™ series, the Turion™ series, or Sempron™ of Advanced Micro Devices, Inc; or other CPUs used for the tablet; the smart phone; the mobile phone; the game terminal; or the internet television. ("Power" is a registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

In the example shown in FIG. 1A, a display (106), such as a liquid crystal display (LCD), is connected to the bus (104) via a display controller (105). The display (106) can be used to display, for management of the computer, information on a computer connected to a network via a communication line and information on software running on the computer using an appropriate graphics interface. In this example, a disk (108) such as a hard disk or a solid state drive, SSD, and a drive (109) such as a CD, a DVD, or a BD (Blu-ray disk) drive are also connected to the bus (104) via an SATA or IDE controller (107). Furthermore, in the example shown in FIG. 1A, the physical device (101) includes a keyboard (111) and a mouse (112) connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program readable from a CD-ROM, a DVD-ROM, or a BD to the disk (108) or to load any data readable from a CD-ROM, a DVD-ROM, or a BD into the main memory (102) or the disk (108).

In some embodiments, the communication interface (114) is based on, for example, but is not limited to, the Ethernet® protocol. The communication interface (114) may be connected to the bus (104) via a communication controller (113). The communication interface (114) physically connects the physical device (101) to a communication line (115) and provides a network interface layer to the TCP/IP communication protocol of a communication function of the operating system of the physical device (101). In this case, the communication line (115) may be a wired or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

The exemplary basic block diagrams can apply also to a virtual machine managing server or an endpoint managing server described in the following figures.

With reference now to FIG. 1B, a computer (121) may be, for example, but is not limited to, a server computer, such as a workstation, a rack-mount type server, a blade type server, or a mainframe server. The computer (121) can be used, for example, as a virtual machine managing server or an endpoint managing server described in the following FIG. 3. Further, the computer (121) can be used for implementing a virtual machine or a connection detecting module described in the following FIG. 3.

The embodiment of computer (121) shown in FIG. 1B comprises a hardware resource (131), a hypervisor (132), called a virtual machine monitor or a virtual operating system, a managing virtual machine (133), called a domain-0 or a parent partition, and one or more virtual machines 1 to n (134-1 to 134-2), called a domain-U or a child partition. Although only two virtual machines are depicted in the embodiment shown in FIG. 1B, it is to be understood that one or more than two virtual machines can be included in other embodiments.

The hardware resource (131) may comprise one or more CPUs (141), a main memory (142), a disk (148) such as a hard disk or a solid state drive (SSD), a communication controller (143), and a communication interface (144). The CPU (141), the main memory (142), the disk (148), the communication controller (143), and the communication interface (144) may correspond to the CPU (102), the main memory (103), the disk (108), the communication controller (113), and the communication interface (114) described in FIG. 1A, respectively.

The hypervisor (132) may, for example, be a part of a computer software, firmware or hardware which may create and run one or more virtual machines. The hypervisor may run directly on the hardware resource (131). The hypervisor (132) may manage a guest operating system (166). The hypervisor (132) may be realized by, for example, but is not limited to, a virtual software, such as VMware®, Hyper-V®, or Xen®. ("VMware" is a registered trademark of VMware Inc. in the United States, other countries, or both; "Hyper-V" is a registered trademark of Microsoft corporation in the United States, other countries, or both; and "Xen" is a registered trademark of Citrix Systems, Inc. in the United States, other countries, or both).

The managing virtual machine (133) may comprise, for example, a managing operating system (151), a control module (152), and a virtual resource (153). The control module (152) may run on the managing operating system (151) and issue a command to the hypervisor (132). The control module (152) may generate one or more virtual machines 1 to n (134-1, 134-2), where n is the total number of virtual machines. Further, the control module (152) may issue a boot command for the guest operating system (166) and control an operation of the one or more virtual machines 1 to n (134-1 to 134-2). The virtual resource (153) may be a hardware resource assigned to the managing virtual machine (133).

The computer (121) may implement at least one of the virtual machines 1 to n (134-1 to 134-2). The virtual machine 1 (134-1) may comprise a virtual resource, such as but not limited to, a virtual CPU (161), a virtual memory (162), a virtual disk (163), a virtual communication controller (164) and a virtual communication interface (165). Further, the virtual machine 1 (134-1) may comprise, for example, but is not limited to, the guest operating system (166) and one or more application(s) 1 to n (167-1 to 167-3), where n is the total number of applications. It is to be understood that the number of applications, n, need not be the same as the number of virtual machines, n. In addition, although FIG. 1B only depicts details of virtual machine 1 (134-1), for ease of explanation, it is to be understood that each virtual machine (e.g. virtual machine 2 (134-2)) can include the same or similar components as virtual machine 1 (134-1).

The guest operating system (166), such as Windows®, UNIX® or Linux®, may run on the virtual machine 1 (134-1). The same applies also to other virtual machines, such as the virtual machine n (134-2). One or more applications (167-1, 167-2, and 167-3) may run on the guest operating system (166). In addition, one or more functions described herein can be implemented via one or more of the applications (167-1, 167-2, and 167-3) run on the guest operating system (166). Furthermore, in some embodiments, the physical device (101) may connect to the virtual machine implemented on the computer (121).

Figure 2A:
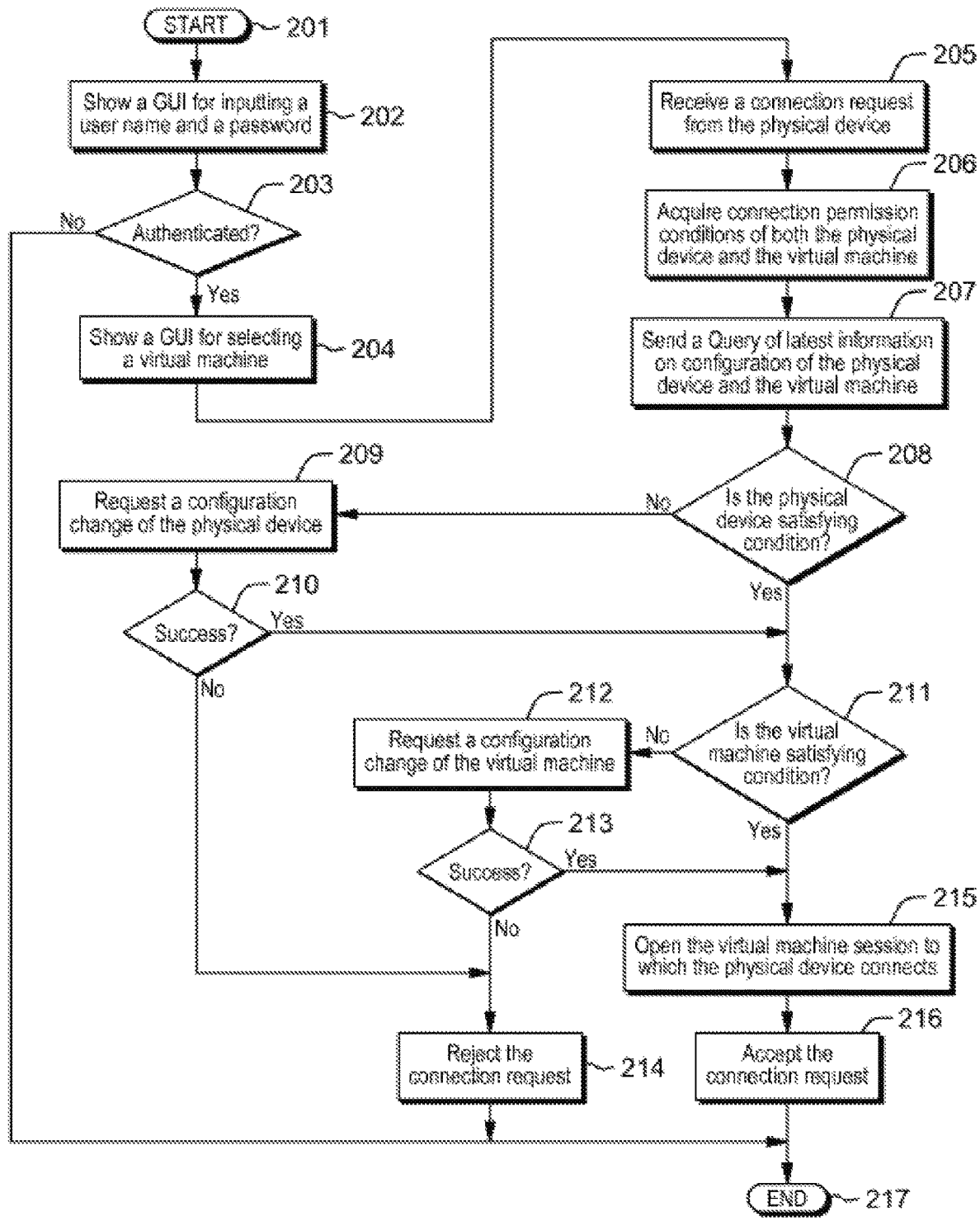
FIG. 2A illustrates one embodiment of a flowchart of a process for controlling a connection between a virtual machine and a physical device.
Figure 2B:
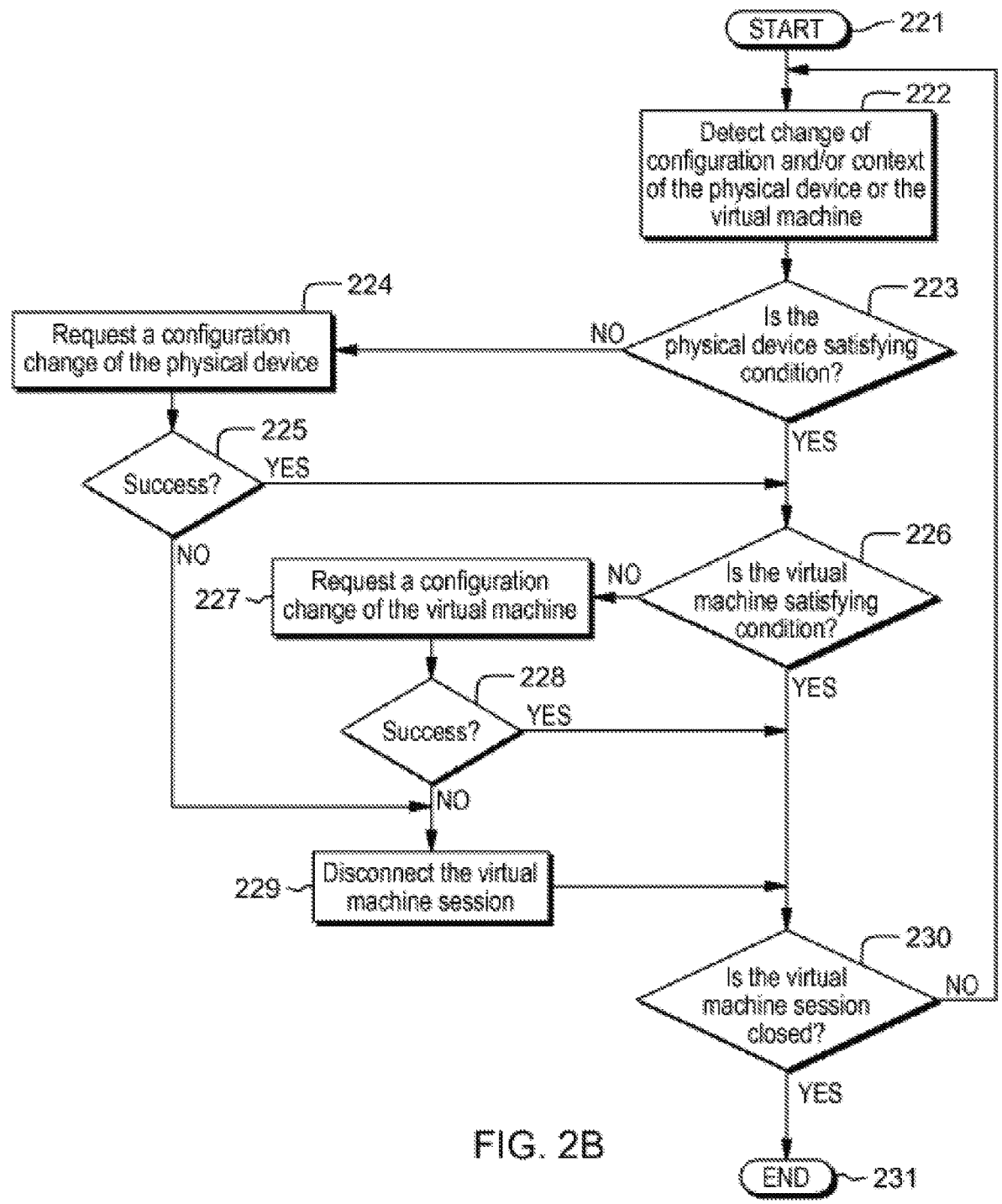
FIG. 2B illustrates one embodiment of a flowchart of a process for controlling a connection between the virtual machine and the physical device.
Figure 3:
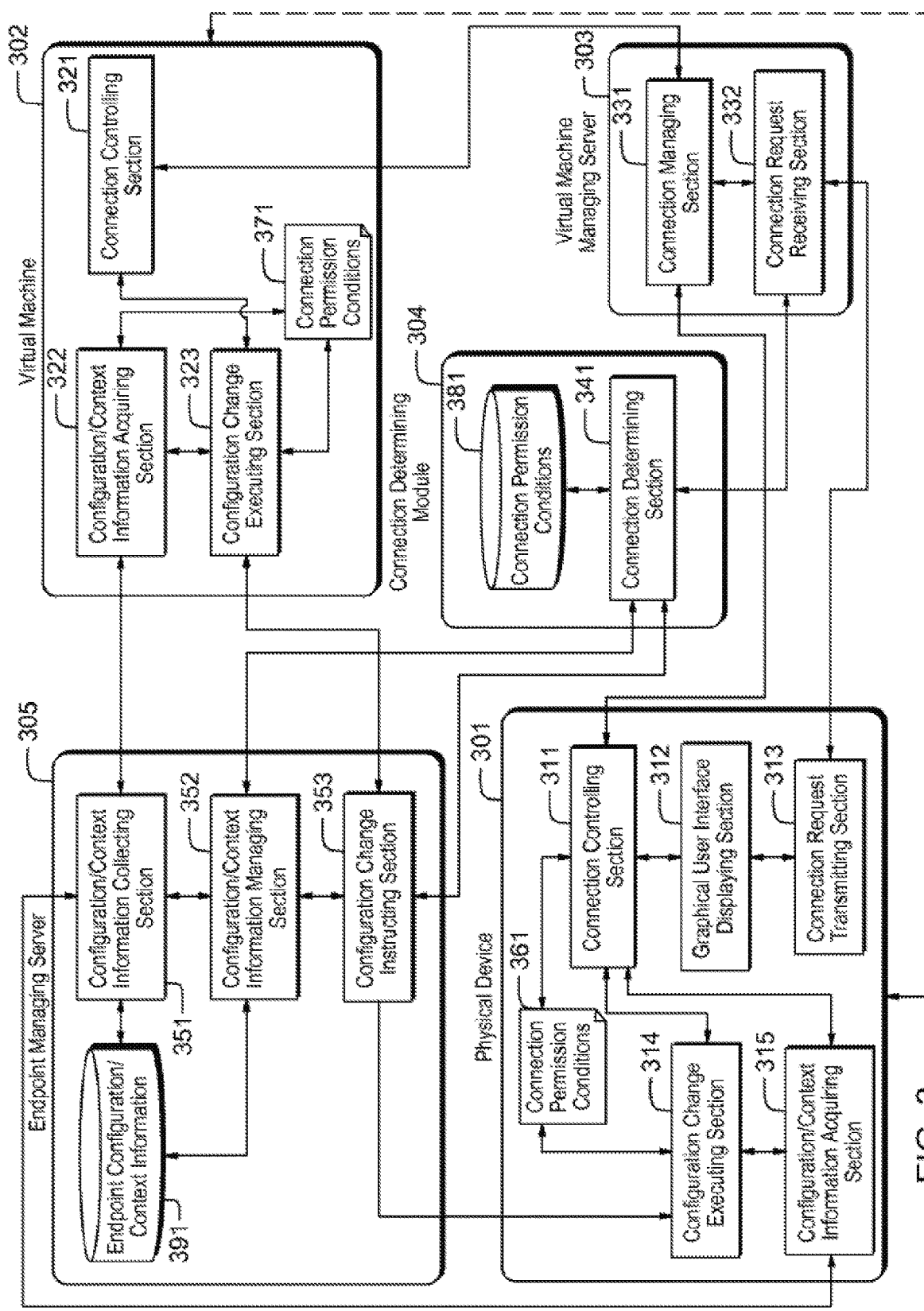
FIG. 3 illustrates one embodiment of an overall functional block diagram of a representative virtual machine and a physical device that may be used in the computer environment described in FIGS. 1A and 1B for providing aspects of the disclosure.

FIGS. 2A and 2B illustrate one embodiment of flowcharts of a process for dynamically controlling a connection between a virtual machine and a physical device. FIG. 3 illustrates one embodiment of an overall functional block diagram of a representative virtual machine and a physical device that may be used in the flowcharts described in FIGS. 2A and 2B.

Prior to explaining the flowcharts of FIGS. 2A and 2B, the overall functional block diagram described in FIG. 3 will be explained first.

FIG. 3 includes a physical device (301), a virtual machine (302), a virtual machine managing server (303), a connection determining module (304), and an endpoint managing server (305), all of which are utilized in the process described in FIGS. 2A and 2B.

The physical device (301) corresponds to, for example, the physical device (101) described in FIG. 1A. The physical device (301) comprises a connection controlling section (311), a graphical user interface displaying section (312), a connection request transmitting section (313), a configuration change executing section (314), and a configuration/context information acquiring section (315). The physical device (301) may connect to the virtual machine (302) or the virtual machine managing server (303), or vice versa, via a communication network such as a wired or wireless channel.

The virtual machine (302) is a software implementation of a physical device (not shown in FIG. 3) which corresponds to, for example, the computer (121) described in FIG. 1B. The virtual machine (302) comprises a connection controlling section (321), a configuration/context information acquiring section (322), and a configuration change executing section (323). The virtual machine (302) may connect to the virtual machine managing server (303) or the endpoint managing server (305), or vice versa, via a communication network such as a wired or wireless channel.

The virtual machine managing server (303) comprises a connection managing section (331) and a connection request receiving section (332). The virtual machine managing server (303) may connect to the connection determining module (304), or vice versa, via a communication network such as a wired or wireless channel.

The connection determining module (304) comprises a connection determining section (341). The connection determining module (304) may refer to a connection permission conditions storage (381). The connection permission conditions storage (381) can be comprised in the connection determining module (304) or connected to the connection determining module (304) via a cable or a communication network such as a wired or wireless channel. The connection determining module (304) may connect to the endpoint managing server (305), or vice versa, via a communication network such as a wired or wireless channel.

The endpoint managing server (305) comprises a configuration/context information collecting section (351), a configuration/context information managing section (352), and a configuration change instructing section (353). The endpoint managing server (305) may refer to an endpoint configuration/context information storage (391). The endpoint configuration/context information storage (391) is comprised in the endpoint managing server (305) or connected to the endpoint managing server (305) via a cable or a communication network such as a wired or wireless channel. The endpoint managing server (305) may connect to the physical device (301), or vice versa, via a communication network such as a wired or wireless channel.

At least two of any combination of the computer on which the virtual machine (302) is created, the virtual machine managing server (303), the connection determining module (304) and the endpoint managing server (305) may be implemented on a same server or different servers as desired for a given implementation.

With reference now to FIG. 2A, the flowchart shows a handling of a connection request from the physical device (301) for connecting the physical device (301) to the virtual machine (302).

A connection permission condition for the virtual machine (302) (hereinafter also referred to as "a first connection permission condition") may be provided prior to, or the start of the process described in FIG. 2A by, for example, a manager or administrator of the virtual machine (302) or may be provided by reading a default setting for the first connection permission condition from a storage, such as the connection permission conditions storage (381), in which the default setting is stored. The first connection permission condition may be modified after the starting of the process by, for example, manager, or administrator of the virtual machine (302). The first connection permission condition may be used to decide whether or not the connection between the virtual machine (302) and the physical device (301) is allowed or to decide whether or not the connection request for connecting the physical device (301) to the virtual machine (302) is accepted. The first connection permission condition may be set according to one or more conditions which are required for allowing a connection to the virtual machine (302) or to the physical device (301) attempting to connect to the virtual machine (302).

The first connection permission condition may define a condition which is required for an allowance of the connection between the virtual machine (302) and the physical device (301) or an acceptance of the connection request from the physical device (301). In one embodiment, the first connection permission condition may define, for example, a configuration, a context, or a combination thereof. Definitions of both the configuration and the context are already described above.

The manager or administrator of the virtual machine (302) may define the first connection permission condition, according to an intended purpose of the virtual machine (302) or the physical device (301), a configuration of the virtual machine (302) or the physical device (301), or data or an application stored in the virtual machine (302) or the physical device (301). The first connection permission condition may be stored in, for example, the connection permission conditions storage (381) to which the connection determining module (304) referred.

A connection permission condition for the physical device (301) (hereinafter also referred to as "a second connection permission condition") may be provided prior to, or the start of the process described in FIG. 2A by, for example, a user, manager, or administrator of the physical device (301), or may be provided by reading a default setting for the second connection permission condition from a storage, such as the connection permission conditions storage (381), in which the default setting is stored. The second connection permission condition may be modified after the starting of the process by, for example, a user, manager, or administrator of the physical device (301). The second connection permission condition may be used to decide whether or not the connection between the virtual machine (302) and the physical device (301) is allowed or to decide whether or not a connection request for connecting the physical device (301) to the virtual machine (302) from the physical device (301) is accepted. The second connection permission condition may be set according to one or more conditions which are required for allowing a connection to the virtual machine (302) or to the physical device (301) attempting to connect the virtual machine (302).

The second connection permission condition may define a condition which is required for an allowance of the connection between the virtual machine (302) and the physical device (301) or an acceptance of the connection request from the physical device (301). In one embodiment, the second connection permission condition may define, for example, a configuration, a context, or a combination thereof. Definitions of the configuration and the context are described above.

The user, manager, or administrator of the physical device (301) may define the second connection permission condition, according to an intended purpose of the virtual machine (302) or the physical device (301), a configuration of the virtual machine (302) or the physical device (301), or data or an application stored in the virtual machine (302) or the physical device (301). The second connection permission condition may be stored in, for example, the connection permission conditions storage (381) to which the connection determining module (304) referred.

At block 201, the physical device (301) starts the process of an embodiment of the method by, for example, starting up an application used for connecting the physical device (301) to a virtual machine (302).

At block 202, after completion of the startup of the application, the graphical user interface displaying section (312) may show on a GUI a display (106) for inputting a user name and password for connecting the physical device (301) to the virtual machine managing server (303), for example, as a new window. In one embodiment, after the completion of the startup of an operating system on a physical device (301), such as a thin client, the physical device (301) may automatically show the GUI on the display (106).

After the GUI is displayed on the display (106), the user of the physical device (301) may input a user name and a password associated with the user name. In response to receipt of the user name and password from the user, the connection request transmitting section (313) may send to the virtual machine managing server (303) the input user-name and password.

At block 203, in response to receipt of the input user name and password from the physical device (301), the virtual machine managing server (303) may decide whether or not the input user name and password are authenticated by referring to a user database in which respective sets of a user name and password associated with the user name are stored. In response to a decision that the input user name and password are authenticated, namely, the input user name and password match a set of a user name and a password associated with the user name in the user database, the virtual machine managing server (303) may proceed to block 204. Meanwhile, in response to a decision that the input user name and password are not authenticated, the virtual machine managing server (303) may proceed to a block 217, and then send to the physical device (301) a notification that the input user name and password are not authenticated. In response to receipt of the notification, the graphical user interface displaying section (312) may show a notification on the display (106) that the input user name and password are not authenticated.

In one embodiment, at block 204, in response to a decision that the input user name and password match a set of a user name and a password associated with the user name in the user database, the connection request receiving section (332) prepares a list of virtual machine(s) which can be available from the physical device (301) and sends the list to the physical device (301). In response to receipt of the list from the virtual machine managing server (303), the physical device (301) retrieves information about the virtual machine(s) in the list. The graphical user interface displaying section (312) then shows on the display (106) a GUI, for example a new window, for selecting a virtual machine. The user of the physical device (301) may select a virtual machine shown in the GUI and then press a connect button icon for connecting to the virtual machine (302). In response to receipt of an instruction generated by pressing the connect button icon by the user, the connection request transmitting section (313) may send to the connection request receiving section (332) a connection request for connecting the physical device (301) to the selected virtual machine (302).

In another embodiment, at block 204, in response to a decision that the input user name and password are authenticated, the connection request receiving section (332) sends to the physical device (301) a notification that the input user name and password were authenticated. In response to receipt of the notification from the virtual machine managing server (303), the physical device (301) retrieves information about virtual machine(s), from, for example, a database in which virtual machine(s) which can be available from the physical device (301) are listed. The graphical user interface displaying section (312) shows on the display (106) a GUI, for example a new window, for selecting a virtual machine. The user of the physical device (301) may select a virtual machine shown in the GUI and then press a connect button icon for connecting to the virtual machine (302). In response to receipt of an instruction generated by pressing the connect button icon by the user, the connection request transmitting section (313) sends to the connection request receiving section (332) a connection request for connecting the physical device (301) to the selected virtual machine (302).

In yet another embodiment, at block 204, in response to a decision that the input user name and password are authenticated, the connection request receiving section (332) automatically assigns a virtual machine available for the physical device (301). The connection request transmitting section (313) then sends to the physical device (301) a notification comprising information on the assigned virtual machine or, alternatively, the method proceeds directly to step 206. In response to receipt of the notification from the virtual machine managing server (303), the graphical user interface displaying section (312) shows the assigned virtual machine on the display (106), for example in a GUI in a new window. The user of the physical device (301) may press a connect button icon for connecting to the virtual machine (302). In response to receipt of an instruction generated by pressing the connect button icon by the user, the connection request transmitting section (313) sends to the connection request receiving section (332) a connection request for connecting the physical device (301) to the virtual machine (302) assigned by the virtual machine managing server (303).

Furthermore, in another embodiment, at block 204, in response to a decision that the input user name and password are authenticated, the connection request receiving section (332) automatically assigns a virtual machine which is available for the physical device (301). The connection request receiving section (332) proceeds to block 205 without sending any notification to the physical device (301). The connection request receiving section (332) generates a pseudo connection request for connecting the physical device (301) to the virtual machine (302) assigned by the virtual machine managing server (303).

At block 205, the connection request receiving section (332) receives the connection request from the connection request transmitting section (313) or the pseudo connection request. In response to receipt of the connection request or the pseudo connection request, the connection request receiving section (332) sends to the connection determining section (341) an inquiry to determine whether or not the virtual machine (302) and the physical device (301) satisfy both of the first and second connection permission conditions.

At block 206, in response to receipt of the inquiry, the connection determining section (341) acquires, from the connection permission conditions storage (381), the first connection permission condition, which is for the virtual machine (302), and the second connection permission condition, which is for the physical device (301).

At block 207, the connection determining section (341) sends to the configuration/context information managing section (352) a query for obtaining latest information on configuration/context of both the physical device (301) and the virtual machine (302). The configuration/context information managing section (352) may obtain from the endpoint information storage (391) the latest information on configuration/context. If there is no latest information on configuration/context, the configuration/context information managing section (352) may request the configuration/context information collecting section (351) to obtain the latest information from the configuration/context information acquiring section (315) and the configuration/context information acquiring section (322). The configuration/context information acquiring section (315) and the configuration/context information acquiring section (322) may obtain the latest information from physical device (301) and the virtual machine (302), respectively. In response to receipt of the latest information, the configuration/context information acquiring section (315) and the configuration/context information acquiring section (322) respectively may send the latest information to the configuration/context information collecting section (351). The configuration/context information collecting section (351) may store the latest information in the endpoint configuration/context information storage (391) and send to the configuration/context information managing section (352) a notification to the effect that the latest information has been obtained. Then, the configuration/context information managing section (352) may obtain from the endpoint information storage (391) the latest information on configuration/context.

At block 208, the connection determining section (341) decides whether or not the physical device (301) satisfies the second connection permission condition. In one embodiment, the connection determining section (341) may decide whether or not the configuration/context of the physical device (301) satisfies the second connection permission condition. In response to a determination that the second connection permission condition is satisfied, the connection determining section (341) sends to the connection request receiving section (332) a notification to the effect that the physical device (301) satisfies the second connection permission condition. The method then proceeds to block 211.

However, in response to a determination that the second connection permission condition is not satisfied, the connection determining section (341) proceeds to block 209. At block 209, in response to a determination that the second connection permission condition is not satisfied, the connection determining section (341) prepares a list of one or more possible or required configuration changes of the physical device (301) which are required for satisfying the second connection permission condition. After preparing the list, the connection determining section (341) sends the list to the configuration change instructing section (353). In response to receipt of the list from the connection determining module (304), the configuration change instructing section (353) sends to the configuration change executing section (314) an instruction for changing the configuration of the physical device (301). The instruction may comprise the one or more possible or required configuration changes of the physical device (301).

In one embodiment, in response to receipt of the instruction from the configuration change instructing section (353), the configuration change executing section (314) displays a GUI for selecting one or more possible or required configuration changes in the instruction on a display (106), for example, as a new window. In response to a selection of one or more possible or required configuration changes by the user, the configuration change executing section (314) changes the configuration of the physical device (301), according to the selected configuration change(s).

In another embodiment, in response to receipt of the instruction from the configuration change instructing section (353), the configuration change executing section (314) may automatically change the configuration of the physical device (301), according to the instruction, without showing the possible or required configuration changes to the user.

In response to a configuration change of the physical device (301), the configuration change executing section (314) may send to the configuration change instructing section (353) a result of the change. The result of the change is either a success or a failure. A successful result means that the physical device (301) satisfies the second connection permission condition and a failure means that the physical device (301) does not satisfy the second connection permission condition. In response to receipt of the result, the configuration change instructing section (353) may send the result to the connection determining section (341).

For example, at block 210, the connection determining section (341) determines whether the result is a success or not. In one embodiment, if the result is a success, the configuration change instructing section (353) sends to the configuration/context information managing section (352) a notification of details of the change in order to update the endpoint configuration/context information storage (391). In another embodiment, if the result is a success, the configuration/context information collecting section (351) collects the changed configuration from the configuration/context information acquiring section (315), without the notification of details of the change from the configuration/context information managing section (352). If the result is a success, the connection determining section (341) proceeds to block 211. Meanwhile, if the result is not success, the connection determining section (341) proceeds to block 214.

At block 211, the connection determining section (341) determines whether or not the virtual machine (302) satisfies the first connection permission condition. In one embodiment, the connection determining section (341) decides whether or not the configuration/context of the virtual machine (302) satisfies the first connection permission condition. In response to a decision that the first connection permission condition is satisfied, the connection determining section (341) may send to the connection request receiving section (332) a notification to the effect that the virtual machine (302) satisfies the first connection permission condition. The method then proceeds to block 215.

However, in response to a decision that the first connection permission condition is not satisfied, the connection determining section (341) proceeds to block 212. At block 212, in response to a determination that the first connection permission condition is not satisfied, the connection determining section (341) prepares a list of one or more possible or required configuration changes of the virtual machine (302) which are required for satisfying the first connection permission condition. After preparing the list, the connection determining section (341) sends the list to the configuration change instructing section (353). In response to receipt of the list from the connection determining module (304), the configuration change instructing section (353) sends to the configuration change executing section (323) an instruction for changing the configuration of the virtual machine (302). The instruction may comprise the one or more possible or required configuration changes of the virtual machine (302).

In response to receipt of the instruction from the configuration change instructing section (353), the configuration change executing section (323) may automatically change the configuration of the virtual machine (302), according to the instruction, in some embodiments.

In response to a configuration change of the virtual machine (302), the configuration change executing section (323) sends to the configuration change instructing section (353) a result of the change. The result of the change is either a success or a failure. In response to receipt of the result, the configuration change instructing section (353) sends the result to the connection determining section (341).

At block 213, the connection determining section (341) determines whether the result is a success or not. In one embodiment, if the result is a success, the configuration change instructing section (353) further sends to the configuration/context information managing section (352) a notification of details of the change in order to update the endpoint configuration/context information storage (391) via, for example, the connection managing section (331). In another embodiment, if the result is a success, the configuration/context information collecting section (351) collects the changed configuration from the configuration/context information acquiring section (322), without the notification of details of the change from the configuration/context information managing section (352). If the result is a success (i.e. the virtual machine (302) satisfies the first connection permission condition), the method proceeds to block 215. Meanwhile, if the result is not a success (i.e. the virtual machine (302) does not satisfy the first connection permission condition, or the change of the configuration of the virtual machine, of the physical device, or of a combination thereof fails or is impossible), the method proceeds to block 214.

At block 214, the connection determining section (341) sends the connection request receiving section (332) a notification to the effect that at least one of the first connection permission condition and the second connection permission condition is not satisfied. The connection request receiving section (332) further sends to the connection request transmitting section (313) a notification to the effect that the connection request is rejected since at least one of the first connection permission condition and the second connection permission condition is not satisfied. After that, the graphical user interface displaying section (312) then may show on the display (106) a GUI, for example a new window, for showing to the user a result to the effect that the connection request is rejected.

At block 215, in response to receipt of one of the following notifications at the connection request receiving section (332), the connection request receiving section (332) opens a session to the virtual machine (302). The notification can indicate that the physical device (301) satisfies the second connection permission condition and that the virtual machine (302) satisfies the first connection permission condition. Alternatively, the notification can indicate that the physical device (301) satisfies the second connection permission condition and that the result of the configuration change of the virtual machine (302) is a success. Alternatively, the notification can indicate that the result of the configuration change of the physical device (301) is a success and that the virtual machine (302) satisfies the first connection permission condition. In another alternatively, the notification can indicate that the result of the configuration change of the physical device (301) is a success and that the result of the configuration change of the virtual machine (302) is a success.

At block 216, the connection request receiving section (332) accepts the connect request and then connects the physical device (301) to the virtual machine (302). Optionally, the connection request receiving section (332) may send the first connection permission condition and the second connection permission condition to the physical device (301) and the virtual machine (302) via the configuration change instructing section (353). At block 217, the process of FIG. 2A ends.

With reference now to FIG. 2B, the flowchart shows a process of handling maintenance of the connection between the physical device (301) and the virtual machine (302). While the virtual machine and the physical device are being connected, the handling of the maintenance includes dynamically detecting the change of the configuration or a context of the virtual machine, of the physical device, or of a combination thereof.

At block 221, the connection managing section (331) may start the embodiment of the process shown in FIG. 2B, for example, in response to establishment of the connection of the physical device (301) to the virtual machine (302). The connection managing section (331) may send an instruction for monitoring a change of the configuration/context to the configuration/context information acquiring section (315) and the configuration/context information acquiring section (322). After the connection of the physical device (301) to the virtual machine (302), the configuration/context information acquiring section (315) may collect the configuration/context information of the physical device (301), for example, at fixed intervals. Similarly, after the connection of the physical device (301) to the virtual machine (302), the configuration/context information acquiring section (322) may collect the configuration/context information of the virtual machine (302), for example, at fixed intervals.

At block 222, in response to receipt of the instruction from the connection managing section (331), the configuration/context information acquiring section (315) obtains the configuration/context information of the physical device (301) from the configuration/context information acquiring section (315) and monitors a change of the configuration/context in the physical device (301). In one embodiment, when the configuration/context information acquiring section (315) detects the change of the configuration/context in the physical device (301), the configuration/context information acquiring section (315) sends to the connection managing section (331) a notification of the change and, optionally, the details of the change.

Similarly, in response to receipt of the instruction from the connection managing section (331), the configuration/context information acquiring section (322) obtains the configuration/context information of the virtual machine (302) and monitors a change of the configuration/context in the virtual machine (302). In one embodiment, when the configuration/context information acquiring section (322) detects the change of the configuration/context in the virtual machine (302), the configuration/context information acquiring section (322) sends to the connection controlling section (311) a notification of the change and, optionally, the details of the change.

At block 223, the connection controlling section (311) may refer the change of the configuration/context in the physical device (301) and the second connection permission conditions and then decide whether or not the physical device (301) satisfies the second connection permission condition. In one embodiment, the connection controlling section (311) decides whether or not the configuration/context of the physical device (301) satisfies the second connection permission condition. In response to a judgment that the second connection permission condition is satisfied, the connection controlling section (311) sends to the connection managing section (331) a notification to the effect that the physical device (301) satisfies the second connection permission condition. The method then proceeds to block 226.

Meanwhile, in response to a judgment that the second connection permission condition is not satisfied, the connection controlling section (311) proceeds to block 224. At block 224, in response to a judgment that the second connection permission condition is not satisfied, the connection controlling section (311) prepares a list of one or more possible or required configuration changes of the physical device (301) which is required for satisfying the second connection permission condition. After preparing the list, the connection controlling section (311) may send to the configuration change executing section (314) an instruction for changing the configuration of the physical device (301) together with the list. The instruction may comprise the one or more possible or required configuration changes of the physical device (301).

In one embodiment, in response to receipt of the instruction from the connection controlling section (311), the configuration change executing section (314) may show the GUI for selecting one or more possible or required configuration changes in the instruction on a display (106), for example, as a new window. In response to a selection of one or more possible or required configuration changes by the user, the configuration change executing section (314) may change the configuration of the physical device (301), according to the selected configuration change(s).

In another embodiment, in response to receipt of the instruction from the connection controlling section (311), the configuration change executing section (314) may automatically change the configuration of the physical device (301), according to the instruction, without showing the possible configuration changes to the user.

In response to a configuration change of the physical device (301), the configuration change executing section (314) may send to the connection controlling section (311) a result of the change. The result of the change is either a success or a failure. In response to receipt of the result, the configuration change executing section (323) sends the result to the connection managing section (331).

At block 225, the connection controlling section (311) determines whether the result is a success or not. In one embodiment, if the result is a success, the connection controlling section (311) sends to the connection managing section (331) a notification of details of the change. In another embodiment, if the result is a success, the connection controlling section (311) sends to the configuration/context information managing section (352) a notification of details of the change in order to update the endpoint configuration/context information storage (391).

If the result is not a success, the method proceeds to block 229, discussed below. If the result is a success, the method proceeds to block 226. At block 226, the connection controlling section (321) may refer the change of the configuration/context in the virtual machine (302) and the first connection permission conditions and then decide whether or not the virtual machine (302) satisfies the first connection permission condition. In one embodiment, the connection controlling section (321) decides whether or not the configuration/context of the virtual machine (302) satisfies the first connection permission condition. In response to a determination that the first connection permission condition is satisfied, the connection controlling section (321) may send to the connection managing section (331) a notification to the effect that the virtual machine (302) satisfies the first connection permission condition. The method then proceeds to block 230, discussed below.

Meanwhile, in response to a judgment that the first connection permission condition is not satisfied, the method proceeds to block 227. At block 227, in response to a determination that the first connection permission condition is not satisfied, the connection controlling section (321) may prepare a list of one or more possible or required configuration changes of the virtual machine (302) which is required for satisfying the first connection permission condition. After preparing the list, the connection controlling section (321) may send to the configuration change executing section (323) an instruction for changing the configuration of the virtual machine (302) together with the list. The instruction may comprise the one or more possible or required configuration changes of the virtual machine (302).

In response to receipt of the instruction from the connection controlling section (321), the configuration change executing section (323) may automatically change the configuration of the virtual machine (302), according to the instruction.

In response to a configuration change of the virtual machine (302), the configuration change executing section (323) may send to the connection controlling section (321) a result of the change. The result of the change is either a success or a failure. In response to receipt of the result, the configuration change instructing section (353) may send the result to the connection managing section (331). In one embodiment, if the result is a success, the connection controlling section (321) further sends to the configuration/context information managing section (352) a notification of details of the change in order to update the endpoint configuration/context information storage (391) via, for example, the connection managing section (331).

At block 228, the connection controlling section (321) determines whether the result is a success or not. In one embodiment, if the result is a success, the connection controlling section (321) sends to the connection managing section (331) a notification of details of the change. In another embodiment, if the result is a success, the connection controlling section (321) sends to the configuration/context information managing section (352) a notification of details of the change in order to update the endpoint configuration/context information storage (391). If the result is a success, the method proceeds to block 230. If the result is not a success, the method proceeds to block 229.

At block 229, in response to determining that the result is not a success at block 225 or block 228, in one embodiment, the connection managing section (331) disconnects the session to the virtual machine (302). Accordingly, in response to the disconnection of the session, the physical device (301) cannot access the virtual machine (302). At block 229, in response to determining that the result is not a success at block 225 or block 228, in another embodiment, the connection managing section (331) cancels the change of the configuration; invalidates the change of the configuration; and/or returns the change of the configuration to a state prior to the changing.

At block 230, the connection managing section (331) determines whether or not the session to the virtual machine is closed. In one embodiment, if the user voluntarily closes the session by logging off the connection, the connection managing section (331) determines that the session to the virtual machine is closed. If the session to the virtual machine is not closed, the connection managing section (331) returns to block 222. If the session to the virtual machine (302) is closed, the method ends at block 231.

In another embodiment, if the session is already disconnected at block 229, the connection managing section (331) determines that the session to the virtual machine is already closed and the method ends at block 231. Meanwhile, if the session is not disconnected at block 229, the connection managing section (331) returns to block 222 since the session is not disconnected and proceeds back to block 222 in order to again decide whether or not the physical device (301) satisfies the second connection permission condition and whether or not the virtual machine (302) satisfies the first connection permission condition at block 226.

In an alternative embodiment, the connection determining section (341) may perform a process comprising blocks 223 to 228 and 230 as seen in steps 208 to 228 and 214 of FIG. 2A, instead of the connection controlling section (311) and the connection controlling section (321).

In an alternative embodiment, at block 224, in response to a decision that the second connection permission condition is not satisfied, the connection controlling section (311) prepares a list of one or more possible or required configuration changes of the physical device (301) which are required for satisfying the second connection permission condition. After preparing the list, the connection controlling section (311) may send to the configuration change instructing section (353) an instruction for changing the configuration of the physical device (301) together with the list. Further, the connection controlling section (311) allows the graphical user interface display section (312) to show the GUI for selecting one or more possible or required configuration changes in the instruction on a display (106), for example, as a new window. In response to a selection of one or more possible or required configuration changes by the user, the connection controlling section (311) may send the selected configuration changes to the configuration change instructing section (353). In response to receipt of the selected configuration changes, the configuration change instructing section (353) may send to the configuration change executing section (314) an instruction for changing the configuration of the physical device (301). In response to receipt of the instruction, the configuration change executing section (314) may change the configuration of the physical device (301), according to the selected configuration change(s). In another embodiment, in response to receipt of the instruction from the configuration change instructing section (353), the connection controlling section (311) allows the configuration change executing section (314) to change the configuration of the physical device (301), according to the instruction, without showing the possible configuration changes to the user. In response to a configuration change of the physical device (301), the configuration change executing section (314) may send to the configuration change instructing section (353) a result of the change. The result of the change is either a success or a failure. In response to receipt of the result, the configuration change instructing section (353) may send the result to the connection controlling section (311).

In an alternative embodiment at block 227, in response to a judgment that the first connection permission condition is not satisfied, the connection controlling section (321) prepares a list of one or more possible or required configuration changes of the virtual machine (302) which are required for satisfying the first connection permission condition. After preparing the list, the connection controlling section (321) may send to the configuration change instructing section (353) an instruction for changing the configuration of the virtual machine (302) together with the list. In response to receipt of the instruction, the configuration change instructing section (353) may send to the configuration change executing section (323) an instruction for changing the configuration of the virtual machine (302). In response to receipt of the instruction, the configuration change executing section (323) may change the configuration of the virtual machine (302). In another embodiment, in response to receipt of the instruction from the configuration change instructing section (353), the connection controlling section (321) allows the configuration change executing section (323) to change the configuration of the virtual machine (302), according to the instruction. In response to a configuration change of the virtual machine (302), the configuration change executing section (323) may send to the configuration change instructing section (353) a result of the change. The result of the change is either a success or a failure. In response to receipt of the result, the configuration change instructing section (353) may send the result to the connection controlling section (321).

Figure 4:
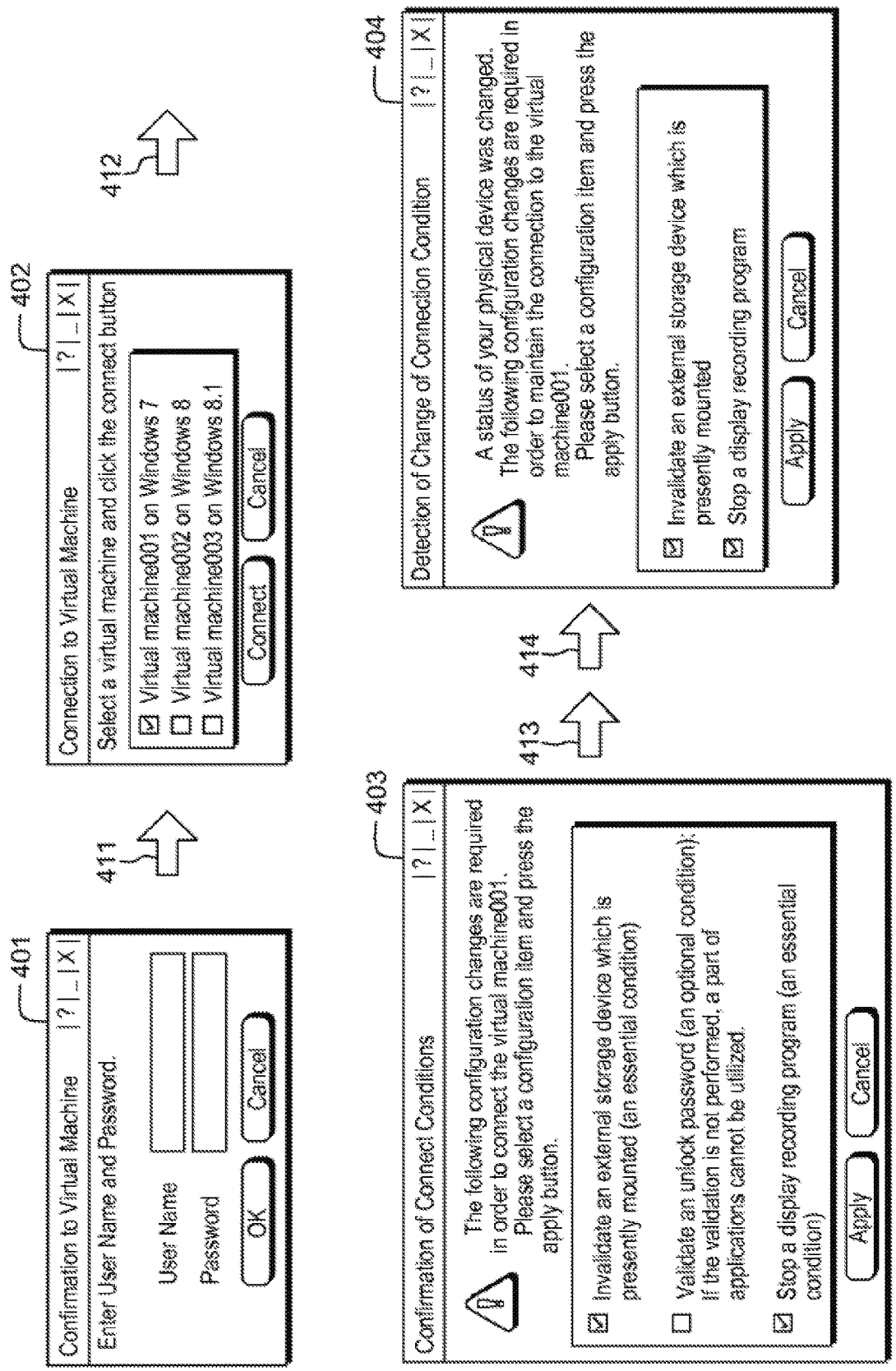
FIG. 4 illustrates one embodiment of a graphical user interface (hereinafter also referred to as "GUI") displayed on the physical device for connecting the physical device to the virtual machine and for maintaining or disconnecting the connection between them.

With reference now to FIG. 4, illustrative GUIs which can be displayed on the display (106) associated with the physical device are depicted. In particular, FIG. 4 shows four windows (401 to 404) which can be displayed in a GUI.

The physical device displays the window (401), for example, after starting up of the application used for connecting the physical device to a virtual machine (see step 202 of FIG. 2A). The window (401) is used for inviting the user to input authentication information, such as a user name and a password associated with the user name.

If a user correctly inputs on the window (401) a user name and a password, as indicated by arrow 411, the window (402) can be displayed. In particular, in response to a judgment that the input user name and password are authenticated (see, for example, block 203 in FIG. 2A), the physical device displays the window (402) in which candidates for available virtual machines are shown (see, for example, block 204 of FIG. 2A). The window (402) is used for selecting, by the user, a virtual machine to which the user would like to connect. If a virtual machine is automatically assigned to the physical device, the window (402) is not displayed and, optionally, the automatically assigned virtual machine is displayed.

The user can select on the window (402) one of the available virtual machines, such as "Virtual machine001 on Windows 7", for example. In response to selection of the virtual machine, "Virtual machine001 on Windows 7", it is decided whether or not the configuration/context of the physical device satisfies the second connection permission condition (see, for example, block 208 of FIG. 2A).

If it is determined that that the second connection permission condition is not satisfied, as indicated by arrow 412 (see, for example, block 208 of FIG. 2A), the physical device may display the window (403), in which configuration changes of the physical device are shown (see, for example, block 209 of FIG. 2A). There may be two types of configuration changes: a required/essential condition and an optional condition, as seen in the window (403). The window (403) may be used for selecting, by the user, one or more of the displayed configuration changes. If a configuration change is automatically performed, the window (403) may not be displayed and the result of the configuration change(s) may be displayed.

A determination that the changes of the configuration of the physical device are successfully performed (see, for example, block 210 of FIG. 2A) means that the physical device satisfies the second connection permission condition. In response to a determination that the physical device and the virtual machine satisfy the second connection permission condition and the first connection permission condition, respectively, the physical device is connected to the virtual machine, as represented, for example, by arrow 413 (see, for example, blocks 215 and 216 of FIG. 2A).

In some embodiments, after the connection between the physical device and the virtual machine is established, a change of the configuration/context of the physical device may be detected, as represented by arrow 414 (see, for example, block 222 of FIG. 2B). In response to the detection of the change, it is decided whether or not the change in the configuration/context of the physical device satisfies the second connection permission condition (see, for example, block 223 of FIG. 2B).

Some non-limiting examples of the change of the configuration/context can include, but are not limited to: patching of an operating system or an application; installation or deletion of an application; validation or invalidation of a device, such as an external device, an input/output device, for example, a digital camera or a video camera; a wired or wireless channel connection, or a cellular phone connection; a security setting, such as auto lock-time of a screen, a method of unlock function, or a password digit number, an existence or nonexistence of an encrypted device, or an access control policy; desktop settings, such as a desktop size, the number of monitors, or color numbers; power saving settings; or print settings, such as a switching of a default printer, or a compulsion of a secure printing.

In response to a determination that the second connection permission condition is not satisfied by the change in the configuration/context of the physical device (see, for example, block 223 of FIG. 2B), the physical device displays the window 404, in which required configuration changes of the physical device are shown (see, for example, block 224 of FIG. 2B). The window 404 is used for selecting, by the user, one or more configuration changes. If a configuration change is automatically performed, the window 404 is not displayed and the result of the configuration change(s) may be displayed.

A determination that the changes of the configuration of the physical device are successfully performed (see, for example, block 225 of FIG. 2B) means that the physical device satisfies the second connection permission condition. In response to the determination that the physical device and the virtual machine satisfy the second connection permission condition and the first connection permission condition, respectively, the connection between the physical device and the virtual machine is maintained (see, for example, block 230 of FIG. 2B).

Meanwhile, a determination that the changes of the configuration of the physical device are not successfully performed (see, for example, block 225 of FIG. 2B) means that the physical device does not satisfy the second connection permission condition. In response to the determination that the physical device does not satisfy the second connection permission condition, the connection between the physical device and the virtual machine is disconnected (see, for example, block 229 of FIG. 2B).

Additionally, in some embodiments, it is also possible for a user not to select a configuration change from the displayed configuration changes. In some such embodiments, not selecting a configuration change may result in a disconnection between the physical device and the virtual machine.

A variety of example scenarios implementing embodiments described herein are discussed in more detail below. It is to be understood that these examples are provided for purposes of explanation only and are not to be taken in a limiting sense.

In one example, a connection between a VDI terminal corresponding to a physical device and a virtual machine is dynamically controlled. In this example, a definition of an environment includes: a high security area is provided in an office and a server which stores confidential information is located in the office; a first printer is located in the security area and a second printer is located outside of the security area in the office; and a dedicated application used for accessing the confidential information, such as a file viewer, is required to access the confidential information.

Additionally, an access control policy is a type of configuration and associated with the first and/or second connection permission conditions. In this example, when a location of the VDI terminal is in the high security area, the access control policy is set to the following: an execution of the dedicated application is allowed; a default printer is set to the first printer; and a print output only to the first printer is allowed.

When the location of the VDI terminal is outside of the security area, the access control policy is set to the following: an execution of the dedicated application is prohibited and, if the dedicated application is running, a window is shown in which a user of the VDI terminal can select, from a menu, a forced termination of the dedicated application or a disconnection between the VDI terminal and the virtual machine (Note: if the disconnection is selected, the dedicated application continues running on the virtual machine in some embodiments. Accordingly, if the user moves back to the high security area and reconnects the virtual machine, the user can continue use of the dedicated application); a default printer is set to the second printer; and a print output only to the second printer is allowed.

When the location of the VDI terminal is outside of the office, the access control policy is set to the following: an execution of the dedicated application is prohibited; and all print output to the first and second printer is prohibited.

Some illustrative techniques for determining a location of a VDI terminal include, but are not limited to, sectioning a range of IP addresses assigned in each area and determining a location of the VDI terminal by the IP address; or recording a location and MAC address of each Wi-Fi access points in the office and determining a location of the VDI terminal from an intensity or signal strength from each Wi-Fi access points.

In response to a decision that at least one of the first and second connection permission conditions is not satisfied, the physical device changes a configuration of the VDI terminal in order to connect the VDI terminal to the virtual machine, such that both of the first and second connection permission conditions are satisfied. In response to a decision that both of the first and second connection permission conditions are satisfied, a connection between the VDI terminal and the virtual machine is established.

While the virtual machine and the physical device are being connected, in response to detection that a change of the location occurs, namely, a context change occurs, a connection between the VDI terminal and the virtual machine is controlled by changing a configuration of the physical device in order to maintain the connection or by disconnecting the connection.

Another example of dynamically controlling a connection between a physical device and a virtual machine includes an access control policy for changing a configuration of the physical device in which a camera and/or microphone function is prohibited during a meeting in order to prevent information leakage by an eavesdropping device and/or photographing device. In response to a decision that at least one of the first and second connection permission conditions is not satisfied, the physical device changes a configuration of the physical device in order to connect the physical device to the virtual machine, such that both of the first and second connection permission conditions are satisfied. For example, the configuration change can include turning off or otherwise preventing the camera and/or microphone function of the physical device. The detection that a user of the physical device is attending the meeting can be performed by judging a location of the user terminal corresponding to the physical device, a schedule of the user, or a combination thereof. In response to a decision that both of the first and second connection permission conditions are satisfied, a connection between the physical device and the virtual machine is established.

Another example of dynamically controlling a connection between a physical device and a virtual machine includes an access control policy for changing a configuration of the physical device such that utilization of data and/or a device is allowed during a predefined specific work in order to prevent information leakage. In response to a decision that at least one of the first and second connection permission conditions is not satisfied, the physical device changes a configuration of the physical device or a virtual machine in order to connect the physical device to the virtual machine, such that both of the first and second connection permission conditions are satisfied. The conditions may comprises predefined circumstances, such as worker ID; working time; a type of virtual machine to which a physical device is connected; and/or working area, such as a connection area. In response to a decision that both of the first and second connection permission conditions are satisfied, a connection between the physical device and the virtual machine is established. Further, a usage of the confidential information, such as floor map or design drawings; or of a specified device, such as a digital camera or digital video for recording a work is allowed.

Another example of dynamically controlling a connection between a physical device and a virtual machine includes an access control policy for changing a configuration of the physical device in response to a status of simultaneous connections in order to prevent a peep of an operation. For example, a same session on a virtual machine can be set to share with other users. In response to a decision that at least one of the first and second connection permission conditions is not satisfied, the physical device changes a setting of the application used for accessing confidential information such that both of the first and second connection permission conditions are satisfied. For example, if another user connects to the same session or a user of the physical device is starting to connect to the same session, a start-up of the application used for accessing confidential information is prohibited. In response to a decision that both of the first and second connection permission conditions are satisfied, a connection between the physical device and the virtual machine is established.

Another example of dynamically controlling a connection between a physical device and a virtual machine includes an access control policy for changing a configuration of the physical device which takes into consideration an application in a running state in order to prevent information leakage. For example, an application used for recording a screen shot can be running on a physical device. In response to a decision that at least one of the first and second connection permission conditions is not satisfied due to, for example, the application used for recording a screen shot running, the physical device changes a configuration of the physical device by terminating an application used for recording a screen shot, such that both of the first and second connection permission conditions are satisfied. In response to a decision that both of the first and second connection permission conditions are satisfied, a connection between the physical device and the virtual machine is established.

Other examples can include dynamically setting access control policies based on a time zone from which the physical device is attempting to connect to the virtual machine or enabling/disabling peripheral components attached to a physical device, such as a USB interface.

The present invention may be a method, a computer system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for controlling a connection between a virtual machine and a physical device, the method comprising:
   receiving a connection request for connecting the physical device to the virtual machine;
   in response to receiving the connection request, determining whether the virtual machine satisfies a first connection permission condition and whether the physical device satisfies a second connection permission condition, wherein the second connection permission condition comprises a configuration of the physical device and a context of the physical device, wherein the context of the physical device comprises a location of the physical device and a current time, wherein the configuration of the physical device comprises a camera function and a microphone function;
   determining that the physical device does not satisfy the second connection permission condition;
   in response to determining that the physical device does not satisfy the second connection permission condition, changing the configuration of the physical device to satisfy the second connection permission condition;
   in response to changing the configuration of the physical device, determining that the virtual machine satisfies the first connection permission condition and that the physical device satisfies the second connection permission condition;
   in response to determining that the virtual machine satisfies the first connection permission condition and that the physical device satisfies the second connection permission condition, accepting the connection request and connecting the physical device to the virtual machine;
   in response to connecting the physical device to the virtual machine, dynamically detecting a change in the configuration of the physical device;
   determining that the dynamically detected change does not satisfy the second connection permission condition;
   invalidating the dynamically detected change; and
   returning the dynamically detected change to a state prior to the changing.

2. The computer-implemented method according to claim 1, further comprising:
   determining that the context of the physical device does not satisfy the second connection permission condition; and
   rejecting the connection request.

3. The computer-implemented method according to claim 1, further comprising:
   in response to receiving the connection request, obtaining a latest configuration and a latest context of each of the virtual machine and the physical device.

4. The computer-implemented method according to claim 3, wherein determining whether the virtual machine satisfies the first connection permission condition and whether the physical device satisfies the second connection permission condition further comprises:
   determining whether the latest configuration of the virtual machine and the latest context of the virtual machine satisfy the first connection permission condition; and
   determining whether the latest configuration of the physical device and the latest context of the physical device satisfy the second connection permission condition.

5. The computer-implemented method according to claim 1, wherein the first connection permission condition comprises a configuration of the virtual machine and a context of the virtual machine, wherein the configuration of the virtual machine is distinct from the context of the virtual machine.

6. The computer-implemented method according to claim 1, wherein the configuration of the virtual machine comprises a security setting, and wherein the context of the virtual machine comprises a progress of a process performed by the virtual machine.

7. A computer system for controlling a connection between a virtual machine and a physical device, the computer system comprising:
   a processor; and
   a computer readable storage medium storing program instructions executable by the processor to cause the processor to perform a method comprising:
   receiving a connection request for connecting the physical device to the virtual machine;
   in response to receiving the connection request, determining whether the virtual machine satisfies a first connection permission condition and whether the physical device satisfies a second connection permission condition, wherein the second connection permission condition comprises a configuration of the physical device and a context of the physical device, wherein the context of the physical device comprises a location of the physical device and a current time, wherein the configuration of the physical device comprises a camera function and a microphone function;
   determining that the physical device does not satisfy the second connection permission condition;
   in response to determining that the physical device does not satisfy the second connection permission condition, changing the configuration of the physical device to satisfy the second connection permission condition;
   in response to changing the configuration of the physical device, determining that the virtual machine satisfies the first connection permission condition and that the physical device satisfies the second connection permission condition;
   in response to determining that the virtual machine satisfies the first connection permission condition and that the physical device satisfies the second connection permission condition, accepting the connection request and connecting the physical device to the virtual machine;
   in response to connecting the physical device to the virtual machine, dynamically detecting a change in the configuration of the physical device;
   determining that the dynamically detected change does not satisfy the second connection permission condition;

invalidating the dynamically detected change; and
returning the dynamically detected change to a state prior to the changing.

8. The computer system according to claim 7, further comprising:
in response to receiving the connection request, obtaining a latest configuration and a latest context of each of the virtual machine and the physical device.

9. The computer system according to claim 8, wherein determining whether the virtual machine satisfies the first connection permission condition and whether the physical device satisfies the second connection permission condition further comprises:
determining whether the latest configuration of the virtual machine and the latest context of the virtual machine satisfy the first connection permission condition; and
determining whether the latest configuration of the physical device and the latest context of the physical device satisfy the second connection permission condition.

10. The computer system according to claim 7, wherein the configuration of the virtual machine comprises a security setting, and wherein the context of the virtual machine comprises a progress of a process performed by the virtual machine.

11. A computer program product for controlling a connection between a virtual machine and a physical device, the computer program product comprising a computer readable storage medium having program instructions embodied therewith, wherein the computer readable storage medium is not a transitory signal per se, the program instructions executable by a processor to cause the processor to perform a method comprising:
receiving a connection request for connecting the physical device to the virtual machine;
in response to receiving the connection request, determining whether the virtual machine satisfies a first connection permission condition and whether the physical device satisfies a second connection permission condition, wherein the second connection permission condition comprises a configuration of the physical device and a context of the physical device, wherein the context of the physical device comprises a location of the physical device, a current time, and a state of an application used for recording a screen shot on the physical device;
determining that the physical device does not satisfy the second connection permission condition;
in response to determining that the physical device does not satisfy the second connection permission condition, changing the configuration of the physical device to satisfy the second connection permission condition;
in response to changing the configuration of the physical device, determining that the virtual machine satisfies the first connection permission condition and that the physical device satisfies the second connection permission condition;
in response to determining that the virtual machine satisfies the first connection permission condition and that the physical device satisfies the second connection permission condition, accepting the connection request and connecting the physical device to the virtual machine;
in response to connecting the physical device to the virtual machine, dynamically detecting a change in the context of the physical device;
determining that the dynamically detected change does not satisfy the second connection permission condition; and
canceling the dynamically detected change by terminating the application.

12. The computer program product according to claim 11, wherein the program instructions are further configured to cause the processor to perform a method further comprising:
determining that the context of the physical device does not satisfy the second connection permission condition; and
rejecting the connection request.

13. The computer program product according to claim 11, wherein the program instructions are further configured to cause the processor to perform a method further comprising:
in response to receiving the connection request, obtaining a latest configuration and a latest context of each of the virtual machine and the physical device.

14. The computer program product according to claim 13, wherein the program instructions are further configured to cause the processor to perform a method further comprising:
determining whether the latest configuration of the virtual machine and the latest context of the virtual machine satisfy the first connection permission condition; and
determining whether the latest configuration of the physical device and the latest context of the physical device satisfy the second connection permission condition.

15. The computer program product according to claim 11, wherein the configuration of the virtual machine comprises a security setting, and wherein the context of the virtual machine comprises a progress of a process performed by the virtual machine.

16. The method according to claim 1, wherein the context of the physical device further comprises an access point and a user identification number.

17. The method according to claim 1, wherein the configuration of the physical device is selected from a group consisting of: a software configuration, a security setting, and an access control policy setting.

* * * * *